Figure 1:
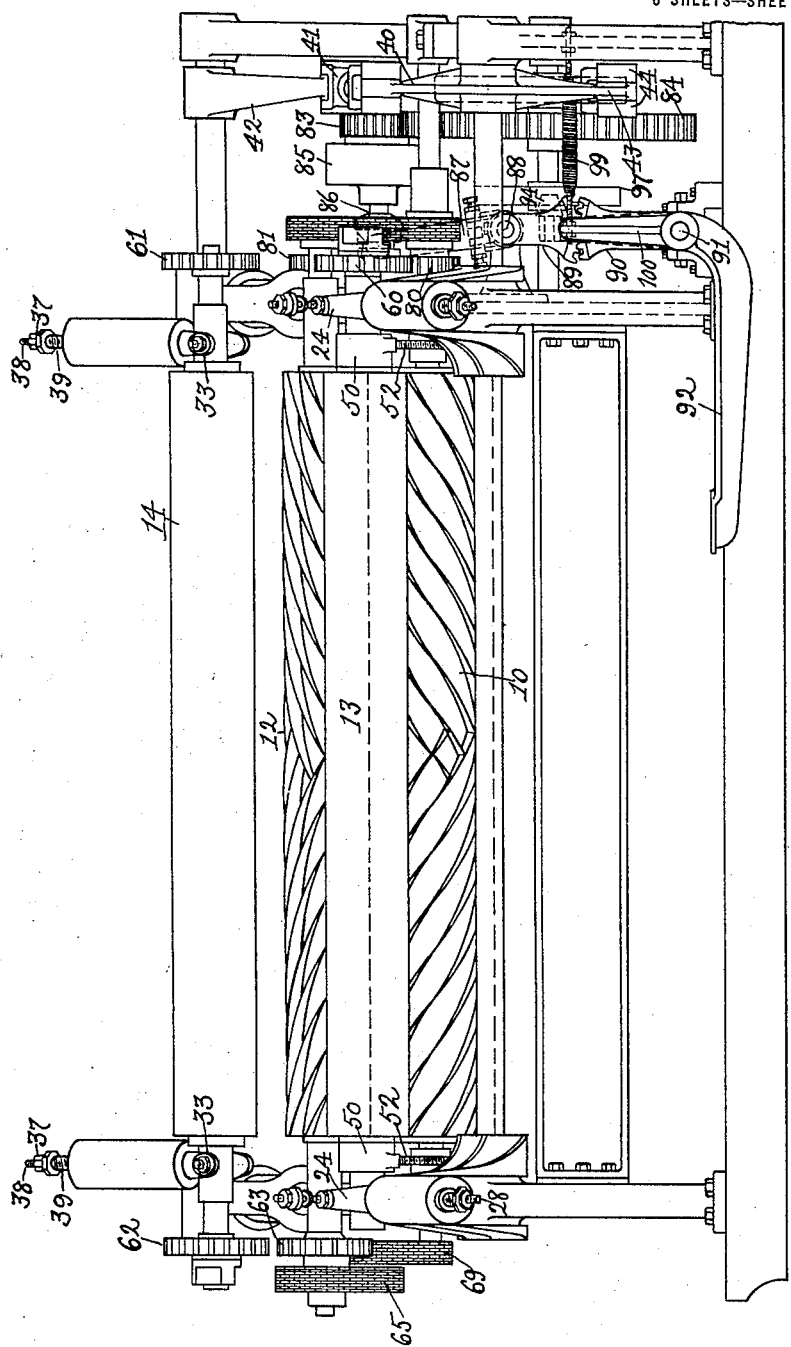

J. W. O'DONNELL.
MACHINE FOR TREATING HIDES, SKINS, AND LEATHER.
APPLICATION FILED AUG. 30, 1919.

1,332,747.

Patented Mar. 2, 1920.
6 SHEETS—SHEET 1.

INVENTOR.
John W. O'Donnell
by Jas. H. Churchill
atty.

J. W. O'DONNELL.
MACHINE FOR TREATING HIDES, SKINS, AND LEATHER.
APPLICATION FILED AUG. 30, 1919.

1,332,747.

Patented Mar. 2, 1920.
6 SHEETS—SHEET 4.

INVENTOR.
John W. O'Donnell
by Jas. H. Churchill
atty.

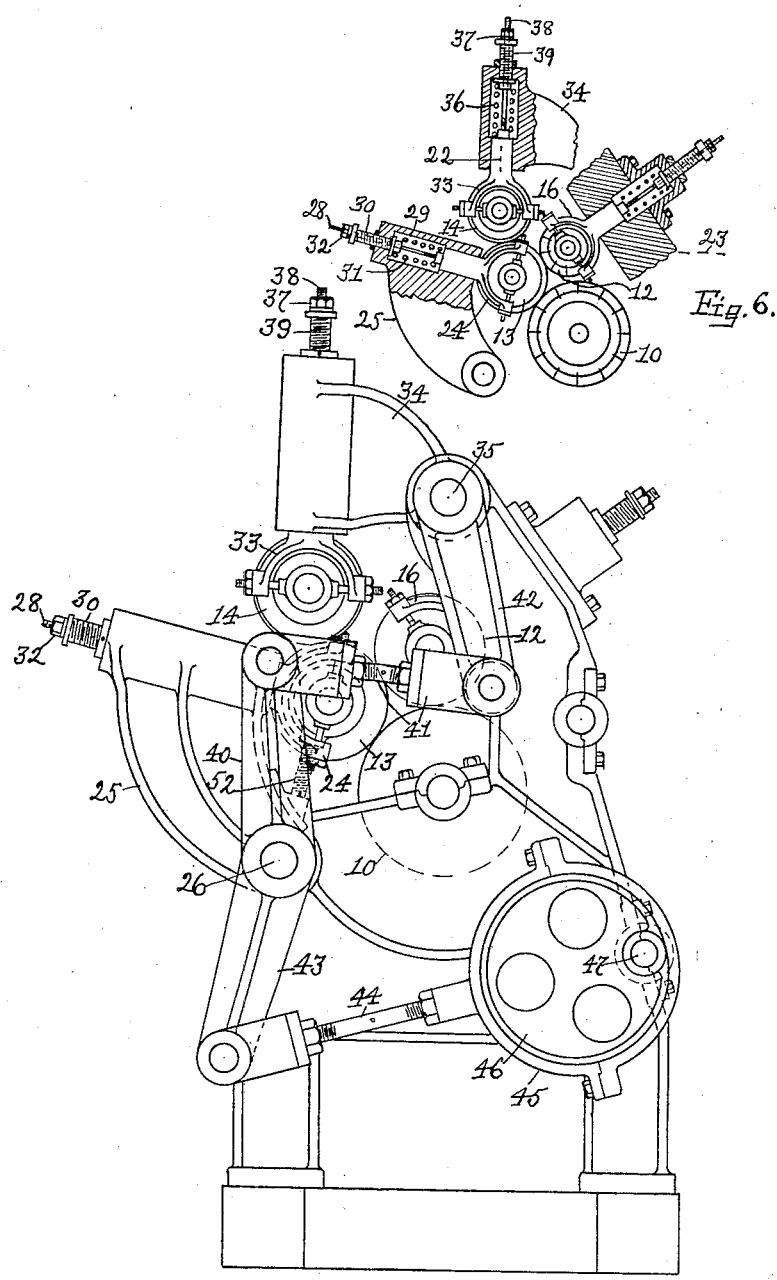

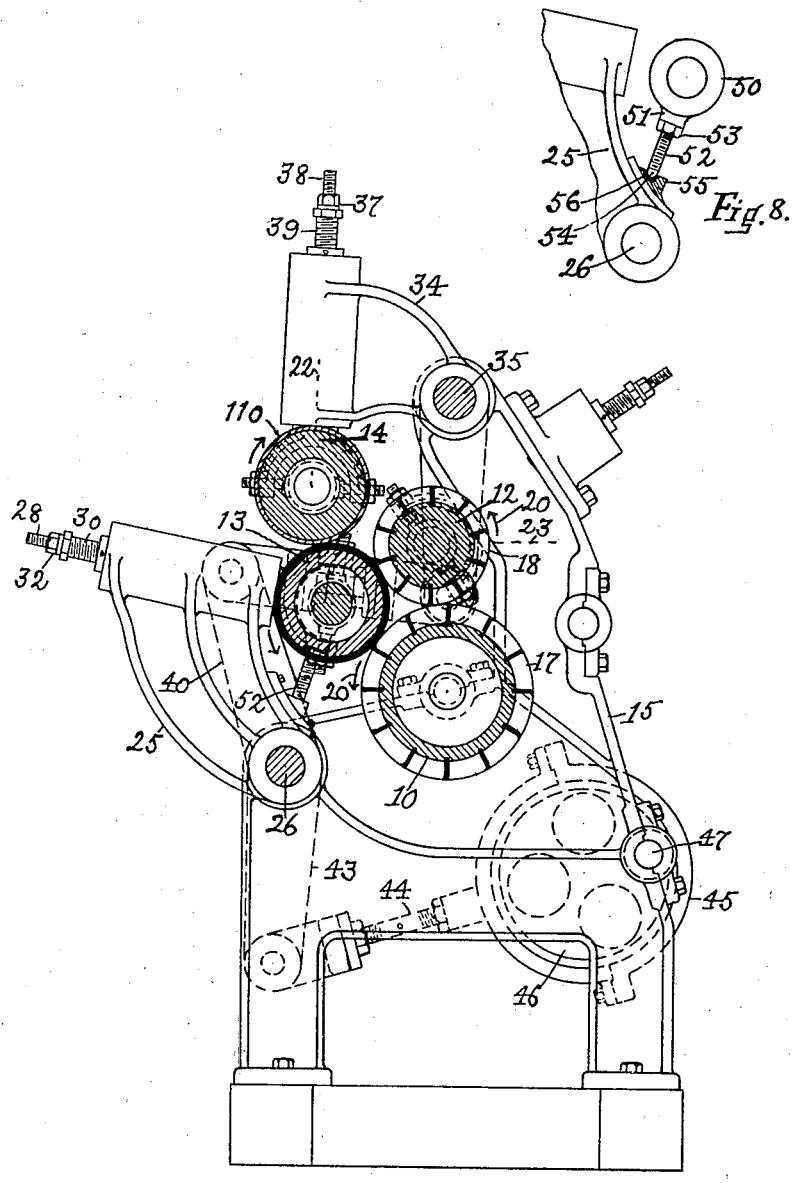

UNITED STATES PATENT OFFICE.

JOHN W. O'DONNELL, OF SALEM, MASSACHUSETTS.

MACHINE FOR TREATING HIDES, SKINS, AND LEATHER.

1,332,747. Specification of Letters Patent. Patented Mar. 2, 1920.

Application filed August 30, 1919. Serial No. 320,781.

*To all whom it may concern:*

Be it known that I, JOHN W. O'DONNELL, a subject of King George V of England, residing at Salem, in the county of Essex and State of Massachusetts, have invented an Improvement in Machines for Treating Hides, Skins, and Leather, of which the following description, in connection with the accompanying drawings, is a specification, like characters on the drawings representing like parts.

This invention relates to a machine for treating hides, skins and leather and more particularly for unhairing, setting-out, putting out and like operations.

The invention is herein shown as embodied in a machine of that class in which the hide or skin is simultaneously acted upon by a plurality of work cylinders having helically arranged blades or vanes of different spirals and revolving in the same direction, and with which coöperates a bed roll, which supports the hide or skin while the latter is being simultaneously worked by the bladed cylinders, and which is positively driven to impart to it the function of a feed roll which coöperates with a second feed roll to feed the hide or skin out of the machine. An example of the class of machines referred to is shown and described in U. S. Patent No. 467,216, granted Jan. 19, 1892, to Arthur E. Whitney, to which reference may be had.

The present invention has for its object to provide a superior machine for working hides, skins and leather, and one in which provision is made for automatically increasing the grip of the bed roll and feed roll upon the hide or skin when a thick portion of the hide or skin is interposed between the bed roll and the working cylinders, whereby the bed roll and feed roll acting as a single pair of feed rolls are enabled to pull or feed the hide or skin against the increased resistance to such feeding movement caused by the plurality of bladed working cylinders acting on the thicker part or parts of the hide or skin.

The invention further has for its object to provide for simultaneously moving the bed roll and feed roll in opposite directions by power, whereby in the open position of the bed roll a wide opening is obtained between it and the feed roll for the insertion of the hide or skin into the machine, and whereby the bed roll is enabled to pass under the feed roll and be properly positioned with relation to the feed roll so as to obtain the increased gripping effect above referred to when the bed roll is in its closed or operative position.

The invention further has for its object to provide the bed roll with supports to take care of the compression or downward pressure on the bed roll when the increased gripping effect above referred to is exerted upon the hide or skin.

These and other features of this invention will be pointed out in the claims at the end of this specification.

Figure 1 is a front elevation of a machine embodying this invention.

Figure 2:
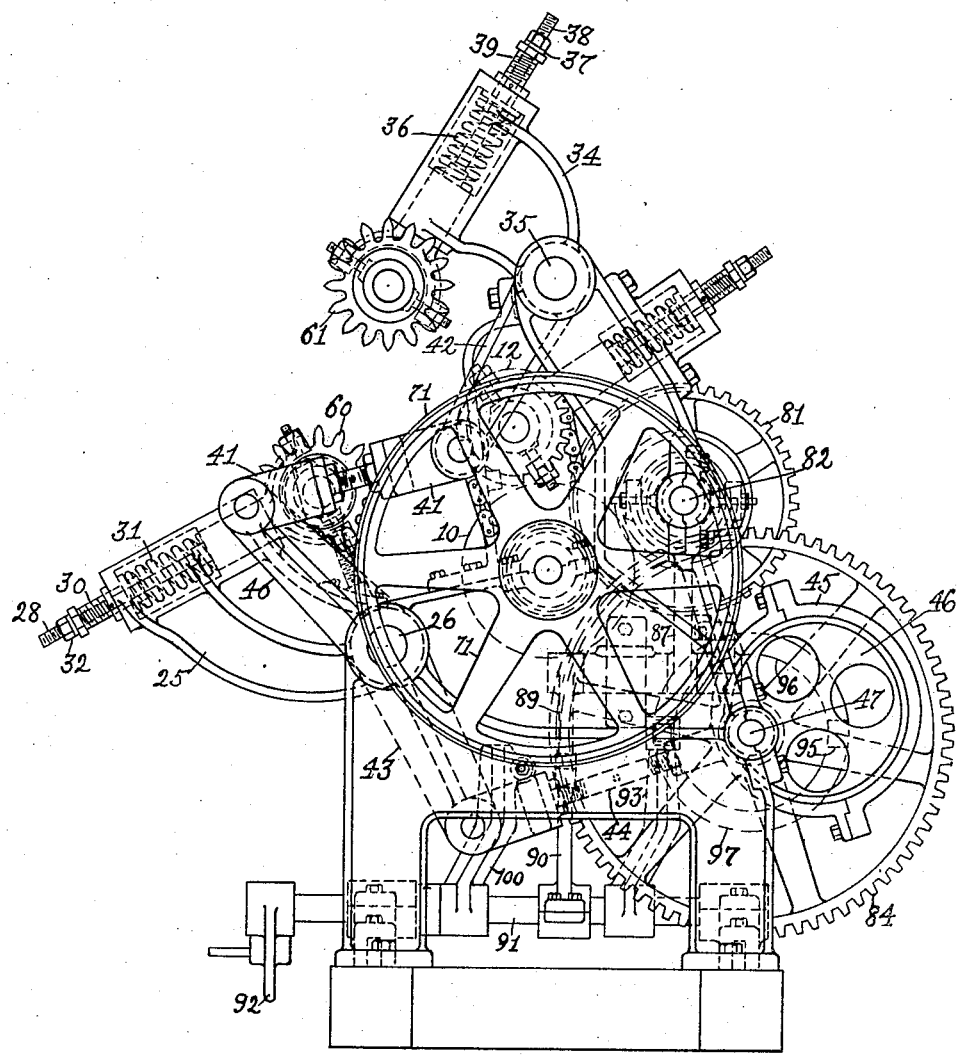

Fig. 2, an end elevation of the machine shown in Fig. 1 looking toward the left.

Figure 3:
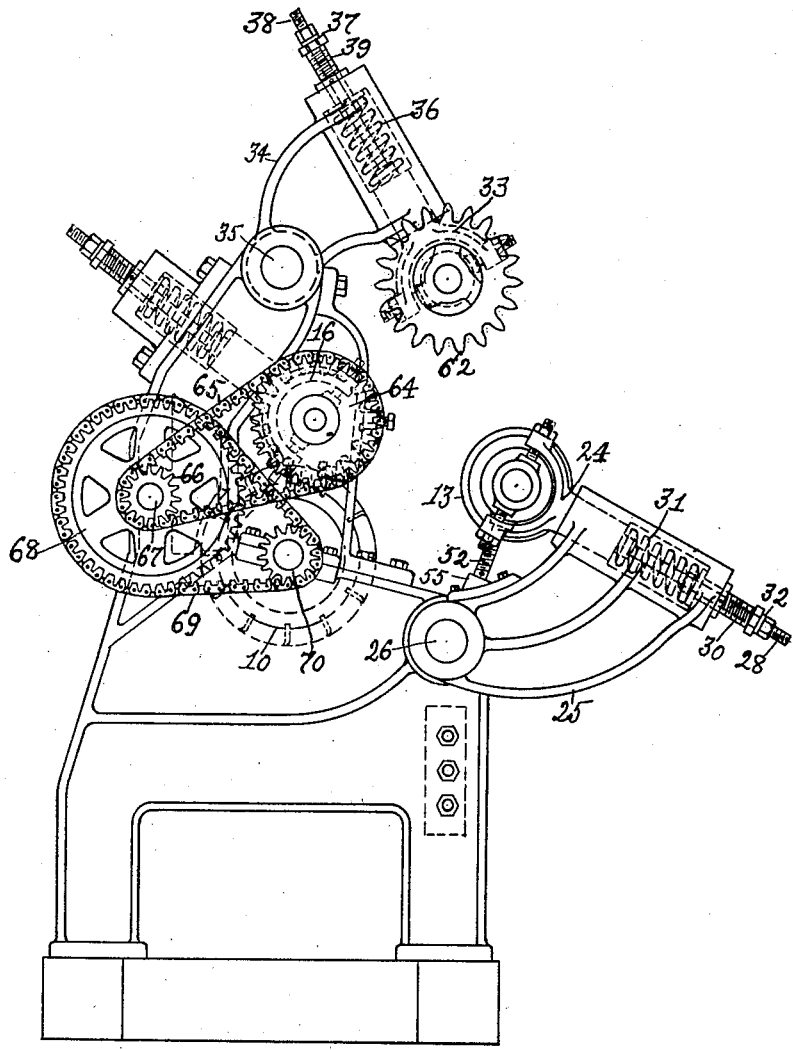

Fig. 3, an end elevation of the machine looking toward the right in Fig. 1.

Figure 4:
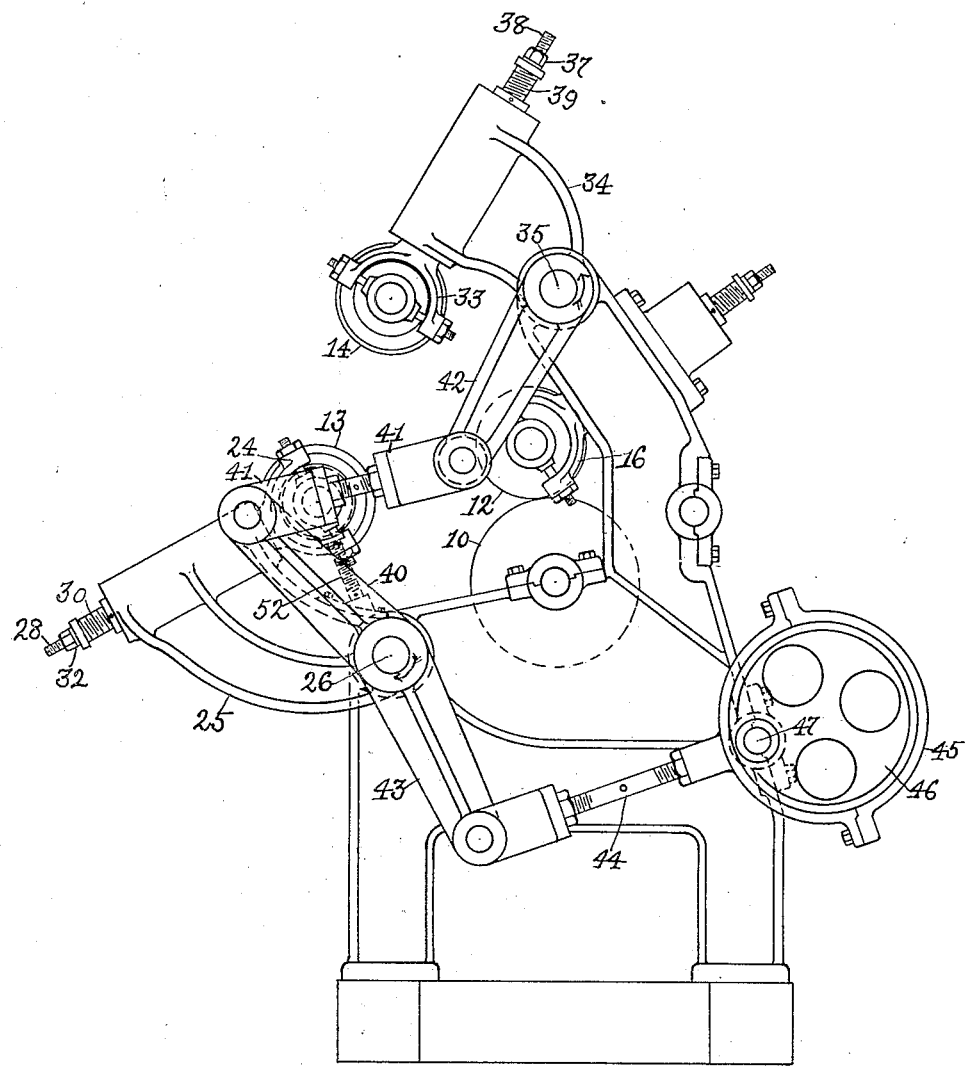

Fig. 4, a diagrammatic view, showing the bed roll in its open position.

Fig. 5, a like view showing the bed roll in its closed position.

Fig. 6, a detail to illustrate the relation of the bed roll to the feed roll and bladed cylinders in the closed position of the bed roll.

Fig. 7, a cross section of the machine with the bed roll in its closed position, and Fig. 8, a detail of the strut or support for the bed roll to be referred to.

Referring to the drawings and particularly to Figs. 4 to 7 inclusive, 10—12 represent two working cylinders or tools, 13 a bed roll coöperating with both and 14 a feed roll coöperating with the bed roll 13 to feed the hide, skin, or leather out of the machine.

The working cylinders 10—12 are practically stationary, the cylinder 10 being mounted in the framework 15 of the machine and the cylinder 12 being mounted in yokes or arms 16 carried by the framework but having provision for adjusting the cylinder 12 with relation to the cylinder 10 and to the bed roll 13 in the closed or operative position of the latter.

The working cylinders 10—12 are provided with helically arranged blades, vanes or working members 17, 18, which may be of the same or different pitches and run at the same or different speeds, as will be described, to perform different work upon the hide, skin or leather, which latter will be hereinafter referred to as the work.

The working cylinders 10—12 are revolved in the same direction as indicated by the arrows 20 in Fig. 7. The bed roll 13 may be of any desired or suitable construction such as now commonly used in machines of this class, and said bed roll is arranged so as to coöperate with both working cylinders 10—12 and is bodily movable with relation to the latter from its open or inoperative position shown in Figs. 3 and 4 into its closed or operative position shown in Figs. 5 and 6 and vice versa.

The feed roll 14 is also arranged so as to coöperate with the bed roll when the latter is in its operative position and is bodily movable in opposite directions with relation to said bed roll.

The bed roll 13 and feed roll 14 are also arranged so that when both are in their operative positions, shown in Figs. 6 and 7, the bed roll has its axial center between the working cylinders and a substantially vertical plane passing through the axial center of the feed roll and indicated by the dotted line 22, Figs. 6 and 7, and the bed roll has its axial center below a substantially horizontal plane passing through the axial center of the upper bladed cylinder 12, and indicated by the dotted line 23.

The bed roll 13 and the feed roll 14 are carried by supports which are movable in opposite directions, and in the present instance the bed roll 13 is journaled in yokes or forked arms 24, adjustably and yieldingly mounted in a pair of cranks or swing arms 25, mounted on a pivot rod or rock shaft 26 supported by the framework of the machine. The swing arms 25 are made of sufficient length to enable the forked arms 24 carried by them to be upwardly inclined with relation to the horizontal plane 23 when the bed roll 13 is in its operative or closed position shown in Figs. 6 and 7.

The bed roll 13 is adjustably and yieldingly mounted in the swing arms by providing the forked arms or yokes 24 with a thread rod 28 extended through a chamber or bore 29 in the swing arm 25 and through a sleeve 30, which is in threaded engagement with the swing arm and by means of which the force of a spring 31 which yieldingly backs up or presses against the bed roll may be adjusted. The bed roll 13 is adjusted in its swing arms by a nut 32 on each threaded rod 28, and this adjustment may be considered the fine adjustment of the bed roll.

The feed roll 14 is similarly mounted in yokes 33 carried by cranks or swing arms 34 mounted on a pivot rod or rock shaft 35 supported by the framework, and the feed roll is yieldingly backed up or pressed against by a spring 36 in each swing arm 34, and may be adjusted in the swing arms by nuts 37 on the threaded rods 38 attached to the yokes 33. The pressure of the spring 36 is regulated by the threaded sleeve 39. The bed roll 13 and feed roll 14 are designed to be simultaneously moved away from each other and into their inoperative or open position shown in Fig. 4 and toward each other into their closed or operative position shown in Fig. 5, and for this purpose the rock shaft 26 has fast on it a crank or arm 40, which is joined by an adjustable or extensible connecting rod 41 with a crank or arm 42 on the rock shaft 35. The rock shaft 26 is also provided with a crank or arm 43, which is connected by an eccentric rod 44 and strap 45 with an eccentric 46 on a shaft 47, which will be hereinafter designated the eccentric shaft.

It will thus be seen that by a half rotation of the eccentric shaft 47, the eccentric 46 will rock the shafts 26, 35 in the direction of the arrows thereon in Fig. 4, and effect bodily movement of the bed roll 13 and feed roll 14 into their operative or closed position shown in Figs. 5 and 7, and that on the next half rotation of the eccentric shaft 47 in the same direction, the bed roll and feed roll will be bodily moved into their inoperative or open position shown in Fig. 4. By means of the adjustable connecting rod 41 a relatively coarse adjustment of the feed roll with relation to the bed roll can be effected, and a finer adjustment can be effected with the adjusting devices carried by the swing arms 25, 34. It will be observed that the bed roll 13 moves in the arc of a circle with the rock shaft 26 as a center, and that the feed roll 14 moves in the arc of a circle with the rock shaft 35 as a center, and the construction and arrangement of the swing arms is such that the bed roll 13 passes under the feed roll 14 when the bed roll is moved into its operative position with relation to the working cylinders, and that the feed roll passes over and beyond the bed roll when moved into its operative position, and it will also be observed that the yokes 24 which carry the bed roll are upwardly inclined with relation to the horizontal plane 23 through the center of the upper working cylinder when the bed roll is in its closed position. In adjusting the bed roll 13 to the working cylinder, it is preferred to adjust it so that when the machine is idle and the bed roll is in its closed or operative position, the operator is enabled to just see daylight between the bed roll and the bladed cylinders, so that when a thin hide or skin is put through the machine, the bed roll is forced back and upwardly into coöperative relation with the feed roll to get the grip necessary to overcome the action or resistance due to the two working cylinders running in the same direction. When a thicker hide or skin or a thicker portion of a thin hide or skin passes between the bed roll and the working cylinders, the backward and upward movement of the bed roll toward the feed roll is increased, so as to still further increase the grip of the bed roll and feed roll on the hide or skin and thus enable a single set of feed rolls, comprising the bed roll 13 and feed roll 14 to feed the hide or skin out of the machine notwithstanding the increased resistance offered by the two working cylinders acting on the thicker portion of the hide or skin.

The backward and upward movement of the bed roll toward the vertical plane 22 through the center of the feed roll 14 has the additional effect of imparting to the feed roll a rolling action on the hide or skin, which rolling action is due to the increased pressure to which the hide or skin is subjected by the bed roll and feed roll. The rolling action referred to has a beneficial effect upon the hide or skin, especially in setting-out thick hides, as the grain side of the hide or skin is given a very smooth and bright surface thereby.

It will be observed that when the swing arms carrying the bed roll and feed roll have been moved into their operative positions shown in Figs. 5 and 7, the bed roll can be moved away from the bladed cylinders 10—12, under the influence of a thick part of the work independently of the swing arms which carry the bed roll, and also without disturbing the swing arms which carry the feed roll, with the result that the bed roll under the influence of the thick part of the work is moved nearer to the feed roll and coöperates with the latter to automatically increase the grip of both rolls upon the work interposed between them, which is an important feature of the invention, as the increased resistance offered to the feed of the work out of the machine by the working cylinders 10—12 is overcome, and proper feeding of the work and consequently proper operation of the machine is thereby insured.

The increased pressure upon the hide or skin supported by the bed roll and due to the rearward and upward movement of the bed roll with relation to the feed roll, which is caused by the thicker portion or portions of the hide passing between the bladed cylinders and the bed roll, imposes upon the journals of the bed roll a very severe strain which is liable in time to break off the journals of the bed roll and thus put the machine out of commission until a new bed roll is substituted for the defective bed roll. This is expensive not only on account of the cost of the bed roll, but also on account of the labor involved, the loss of the use of the machine, etc. Provision is therefore made for avoiding these objectionable features, and to this end, the bed roll is provided with additional supports which transmit the strain or pressure placed on the journals thereof to the swing arms 25 and thereby to the frame of the machine. In the present instance one construction of strut or support is shown, see Fig. 8, which consists of a sleeve or collar 50 on each journal of the bed roll, having a threaded hollow boss 51 into which is extended a threaded rod 52 provided with a lock nut 53 and at its free end with a ball or rounded head 54, which bears against the swing arm 25 substantially in line with the rock shaft 26 on which the swing arm is mounted. The lower or free end of the strut or rod 52 is secured to the swing arm by a cap 55 having a rounded socket 56 in which the ball or rounded head 54 turns or pivots and having provision for movement of the rod 52 to enable the bed roll to move toward and away from the feed roll as the hide or skin passing between the bed roll and bladed cylinders increases or decreases in thickness.

By reference to Fig. 4, it will be seen that the movements of the bed roll 13 and feed roll 14 away from each other and into their inoperative positions, affords a wide opening through which the operator can quickly and easily place the hide or skin into the machine without liability of the hide or skin being damaged or the operator being injured by the bladed cylinders which run continuously.

Provision is made for positively driving the bed roll when the latter is in its closed position so that it can function as a feed roll. This result is accomplished in the present instance by providing the bed roll 13 at one end with a gear 60, see Figs. 1 and 2, which in the closed or operative position of the bed roll, meshes with and is driven by a gear 61 on one end of the feed roll 14. The feed roll 14 when in its operative position is driven by the lower working cylinder 10. To this end the feed roll 14 is provided at its opposite end with a gear 62, which meshes with and is driven by a gear 63 loosely mounted on the shaft of the upper working cylinder 12 and having attached to it a sprocket wheel 64, see Fig. 3, connected by a link chain 65, with a sprocket wheel 66, which is loosely mounted on a stud shaft 67 and has attached to it a larger sprocket wheel 68 connected by a link chain 69 with a sprocket wheel 70 on the shaft of the lower cylinder 10. The shaft of the lower cylinder 10 is provided with a pulley 71, which is continuously driven. It will thus be seen that the upper bladed cylinder is positively driven by the lower bladed cylinder and that they revolve in the same direction, and further that the upper bladed cylinder positively drives the feed roll 14, which in turn positively drives the bed roll.

The bed roll 13 and feed roll 14 are moved into their operative and inoperative positions by power, to wit, by the eccentric 46 on the shaft 47, and provision is made for intermittently rotating the eccentric shaft 47 after the manner common to power operated hide and leather working machines, and as the manner of controlling the rotation of the eccentric shaft 47 is not herein claimed as it is fully explained in U. S. Patent No. 696,588, dated April 1, 1902, it need only be briefly referred to.

As stated above, the lower working cylinder 10 is continuously driven, and is provided with a pinion 80, see Fig. 1, which meshes with and drives a gear 81 on a countershaft 82, which is provided with a pinion 83 normally loose thereon and meshing with a large gear 84 on the eccentric shaft 47. The pinion 83 has fast to it a clutch member 85, with which coöperates a movable clutch member 86, which is keyed to the countershaft 82, and is moved thereon into engagement with the member 85 by an arm 87 fast on a rock shaft 88, having a toothed arm 89 which meshes with a toothed arm 90 on a rock shaft 91 having fast thereon a crank or arm 92 constituting a foot treadle. The rock shaft 91 also has fast on it a crank or arm 93, provided with a projection 94, which is designed to enter diametrically opposite slots 95, see dotted lines Fig. 2, in an annular flange 96 on a disk 97 fast on the eccentric shaft 47. The flanged disk 97 is commonly known as a stop disk as it coöperates with the stop arm 93 to arrest rotation of the eccentric shaft 47 at the end of each half revolution when the operator removes his foot from the treadle or foot lever 92.

The projection 94 on the stop arm 93 is entered into one of the slots 95 by a spring 99 connected with an arm 100 on the rock shaft 91. The operation of the machine herein shown may be briefly described as follows:

The operator places one half of the hide or skin over the bed roll with the latter in its inoperative position shown in Fig. 4, and when the hide or skin is properly placed on the bed roll, the operator depresses the foot treadle 92, which rocks the shaft 91 and withdraws the stop projection 94 from one of the slots 95 in the stop disk, and at the same time the clutch member 86 is coupled with the clutch member 85 and the eccentric shaft 47 is started in rotation, and moves the bed roll 13 and feed roll 14 into their operative position shown in Figs. 5, 6 and 7. At or about the time the bed roll and feed roll have been brought into their operative position, the second slot 95 in the stop disk is brought into line with the projection 94 on the stop arm 93 and the said projection is entered into said slot by the spring 99, which action rocks the shaft 91 so as to throw out the clutch member 86 and also stop rotation of the eccentric shaft 47. The hide or skin is then fed out of the machine and the portion within the machine is acted upon by the two working cylinders.

When the hide or skin has been fed out of the machine the operator again depresses the foot treadle to release the stop disk and connect the eccentric shaft 47 to the countershaft 82 and thereby cause the bed roll and feed roll to be moved into their inoperative positions. The hide or skin is then reversed and the other half placed into the machine and subjected to the action of the bladed cylinders as above described.

In the machine herein shown, the upper bladed cylinder 12 is shown as of smaller diameter than the lower cylinder 10 and the blades of the cylinder 12 are of a different pitch from the blades of the cylinder 10, but it is not desired to limit the invention in this respect, as the cylinders may be of the same diameter and run at different speeds, and the blades may be of the same pitch. For instance, when used for unhairing and setting-out the cylinders may be of the same diameter and have blades of different pitch and be run at different speeds, or they may be of different diameters and have blades of the same pitch preferably 42″, or of different pitch and run at the same speed; and for putting out the blades may be of the same pitch preferably 42″ and run at the same or different speeds, they being run preferably at different speeds if of the same diameter and at the same speed if of different diameters.

When used for setting-out, it is preferred to provide the feed roll with a smooth metal sleeve 110, but when used for putting out it is preferred to substitute a non-metallic sleeve, preferably of felt for the metal sleeve 110. Furthermore, the arrangement herein described for obtaining the increased grip of the bed roll and feed roll when a thick part of the work is being worked, can be used to advantage in machines employing only one working cylinder and while it is of special advantage when two working cylinders are used it is not desired to limit the invention in this respect. From the above description and by reference to Figs. 4, 5, 6 and 7, it will be seen that the swing arms carrying the bed roll and feed roll are so proportioned and arranged that when the bed roll and feed roll are in their operative positions as shown in Figs. 5, 6 and 7, the axial center of the bed roll is beyond the vertical plane 22 through the axial center of the feed roll in the operative position of the latter; and that when in this position the bed roll is capable of being moved nearer to the feed roll and independently of its swing arms, and further that when the swing arms are moved backwardly or into their open position as shown in Fig. 4, the bed roll and feed roll move away from the said vertical plane on the same side thereof and also away from each other, the feed roll being moved upwardly and the bed roll backwardly and more or less downward.

By this construction and arrangement of the swing arms and the bed roll and feed roll carried by them, which are positively driven when in their operative positions so as to function as feed rolls, I am enabled to obtain such an increased grip upon the hide as to insure proper feed of the hide under all conditions of use and even when the feed roll is provided with the smooth metal sleeve 110, and thereby avoid the necessity of using an extra feed roll in the case, where, first, a separate pair of feed rolls is employed with a bed roll, which latter does not function as a feed roll, as in U. S. Patent No. 1,303,840 granted to me May 13, 1919, and second, in those cases where the extra feed roll functions as a pinch roll in coöperation with a feed roll and a bed roll functioning as a feed roll, as in U. S. Patent No. 900,334, granted October 6, 1908 to R. F. Whitney. One embodiment of the invention is herein shown but it is not desired to limit the invention to the particular construction shown.

Claims:

1. In a machine of the character described, in combination, a plurality of work cylinders, a bed roll coöperating with said work cylinders to enable the latter to simultaneously act on the work on said bed roll, swing arms pivoted below the operative position of the bed roll and in which said bed roll is mounted to move independently of said swing arms, a feed roll coöperating with said bed roll, swing arms pivoted above the operative position of said bed roll and in which said feed roll is mounted, said swing arms being constructed and arranged with relation to each other to enable the bed roll and feed roll to be moved into their operative positions with the axial center of the bed roll beyond a vertical plane through the axial center of the feed roll, means for permitting backward movement of the bed roll independently of its swing arms, means for connecting said swing arms together to enable them to be moved in opposite directions, power operated means for moving said swing arms, and means for positively rotating said bed roll and feed roll in their operative positions.

2. In a machine of the character described, in combination, a plurality of work cylinders arranged one above the other, a bed roll coöperating with both of said cylinders, a feed roll coöperating with said bed roll, means for moving said bed roll and feed roll toward and away from each other, means for positioning the bed roll below the feed roll in the operative position of the latter with the axial center of the bed roll below a substantially horizontal plane through the upper working cylinder and beyond a substantially vertical plane through the feed roll when the latter is in its operative position, means for permitting the bed roll to be moved independently of its swing arms to enable the bed roll to be moved upwardly and rearwardly toward said feed roll by a thick portion of the work to increase the grip of the bed roll and feed roll upon the work when said thick portion of the work is interposed between said bed roll and said working cylinders, and means for positively rotating said bed roll and feed roll when in their operative position.

3. In a machine of the character described, in combination, a plurality of work cylinders, a bed roll coöperating with said work cylinders to enable the latter to simultaneously act on the work on said bed roll, swing arms pivoted below the operative position of the bed roll and in which said bed roll is mounted to move independently of said swing arms, a feed roll coöperating with said bed roll, swing arms pivoted above the operative position of said bed roll and in which said feed roll is mounted, said swing arms being constructed and arranged with relation to each other to enable the bed roll and feed roll to be moved into their operative positions with the axial center of the bed roll beyond a vertical plane through the axial center of the feed roll, means for permitting backward movement of the bed roll independently of its swing arms, means for connecting said swing arms together to enable them to be moved in opposite directions, power operated means for moving said swing arms, means for positively rotating said bed roll and feed roll in their operative positions, and means coöperating with said bed roll to resist the downward pressure upon the latter caused by the increased grip of the bed roll and feed roll upon the work.

4. In a machine of the character described, in combination, a plurality of work cylinders arranged one above the other, a bed roll coöperating with said work cylinders, swing arms carrying said bed roll and pivoted below the operative position of the latter, a feed roll coöperating with said bed roll, swing arms carrying said feed roll and pivoted above the working position of said bed roll, said swing arms being constructed and arranged with relation to each other to enable the bed roll and feed roll to be moved into their operative positions with the axial center of the bed roll beyond a vertical plane through the axial center of the feed roll, means for permitting backward movement of the bed roll independently of its swing arms, means for moving said swing arms in opposite directions, and means for positively rotating said bed roll and feed roll in their operative positions.

5. In a machine of the character described, in combination, a plurality of work cylinders arranged one above the other, a bed roll coöperating with said work cylinders, swing arms carrying said bed roll and pivoted below the operative position of the latter, and supports for said bed roll extended below the same and engaged with said swing arms to move therewith, a feed roll coöperating with said bed roll, swing arms carrying said feed roll and pivoted above the working position of said bed roll, said swing arms being constructed and arranged with relation to each other to enable the bed roll and feed roll to be moved into their operative positions with the axial center of the bed roll beyond a vertical plane through the axial center of the feed roll, means for permitting backward movement of the bed roll independently of its swing arms, means for moving said swing arms in opposite directions, and means for positively rotating said bed roll and feed roll in their operative positions.

6. In a machine of the character described, in combination, a working tool, a bed roll coöperating with said tool, swing arms pivoted below the operative position of said bed roll and in which said bed roll is yieldingly mounted, to permit the bed roll to be moved by a thick portion of the work independently of said swing arms, a feed roll coöperating with said bed roll, swing arms pivoted above the operative position of said bed roll and in which said feed roll is mounted, said swing amrs being constructed and arranged with relation to each other to enable the bed roll and feed roll to be moved into their operative positions with the axial center of the bed roll beyond a vertical plane through the axial center of the feed roll, and means for moving said swing arms to cause said bed roll and feed roll to be moved toward and from each other, and means for positively rotating said bed roll and feed roll.

7. In a machine of the character described, in combination, a working tool, a bed roll coöperating with said tool, swing arms pivoted below the operative position of said bed roll and in which said bed roll is yieldingly mounted to permit the bed roll to be moved by a thick portion of the work independently of said swing arms, a feed roll coöperating with said bed roll, swing arms pivoted above the operative position of said bed roll and in which said feed roll is mounted, said swing arms being constructed and arranged with relation to each other to enable the bed roll and feed roll to be moved into their operative positions with the axial center of the bed roll beyond a vertical plane through the axial center of the feed roll, and power operated means for moving said swing arms to cause said bed roll and feed roll to be moved toward and from each other, and means for positively rotating said bed roll and feed roll.

8. In a machine of the character described, in combination, a working tool, a bed roll coöperating with said tool, swing arms carrying said bed roll, a feed roll coöperating with said bed roll, swing arms carrying said feed roll, said swing arms being constructed and arranged with relation to each other to enable the bed roll and feed roll to be moved into their operative positions with the axial center of the bed roll beyond a vertical plane through the axial center of the feed roll, means for moving said swing arms to cause the bed roll and feed roll to be moved toward and from each other, and means for yieldingly acting on said bed roll in its swing arms to permit the bed roll to be moved with relation to its swing arms and said feed roll by a thick portion of the work without moving the swing arms which carry the bed roll with relation to the swing arms carrying said feed roll.

9. In a machine of the character described, in combination, swing arms, a bed roll yieldingly mounted in said swing arms to move toward and from the same, and struts carried by said swing arms and coöperating with said bed roll to support the latter and to transmit to said swing arms pressure applied to the bed roll in a direction transversely to the path of movement of the bed roll toward and from the swing arms.

10. In a machine of the character described, in combination, swing arms, a bed roll mounted in said swing arms, and struts carried by said swing arms and coöperating with said bed roll to form an additional support therefor and to transmit to said swing arms pressure applied to the bed roll.

11. In a machine of the character described, in combination, a working tool, a bed roll to support the work, swing arms carrying said bed roll, a rock-shaft located below the operative position of said bed roll and on which said swing arms are mounted to move therewith, a feed roll coöperating with said bed roll, swing arms carrying said feed roll, a rock-shaft located above the operative position of said bed roll and on which the swing arms carrying the feed roll are mounted to move therewith, means for connecting said rock-shafts together, and power-operated means connected with one of said rock-shafts to effect movement of said swing arms and cause the feed roll to be moved upwardly and the bed roll downward and vice versa with relation to each other.

12. In a machine of the character described, in combination, a working tool, a bed roll to support the work, a feed roll coöperating with said bed roll, swing arms carrying said bed roll, swing arms carrying said feed roll, said swing arms being constructed and arranged to enable the bed roll and feed roll to be moved into their operative positions with the axial center of said bed roll beyond a vertical plane through the axial center of the feed roll in the operative position of the latter, means for permitting movement of said bed roll independently of its swing arms to enable the bed roll to be automatically moved backward and nearer to the feed roll under the influence of the work and thereby increase the grip of the bed roll and feed roll upon the work when a thick portion of the latter is being operated upon by said working tool, means for moving said swing arms, and means for positively rotating said bed roll and feed roll when in their operative positions.

In testimony whereof I have signed my name to this specification.

JOHN W. O'DONNELL.